June 14, 1938.  J. J. WILLIAMS ET AL  2,120,272

VACUUMIZER

Filed July 11, 1935  8 Sheets-Sheet 1

Inventors
John J. Williams
Joseph Bauman

Eclastu, Eclaston
Attorneys

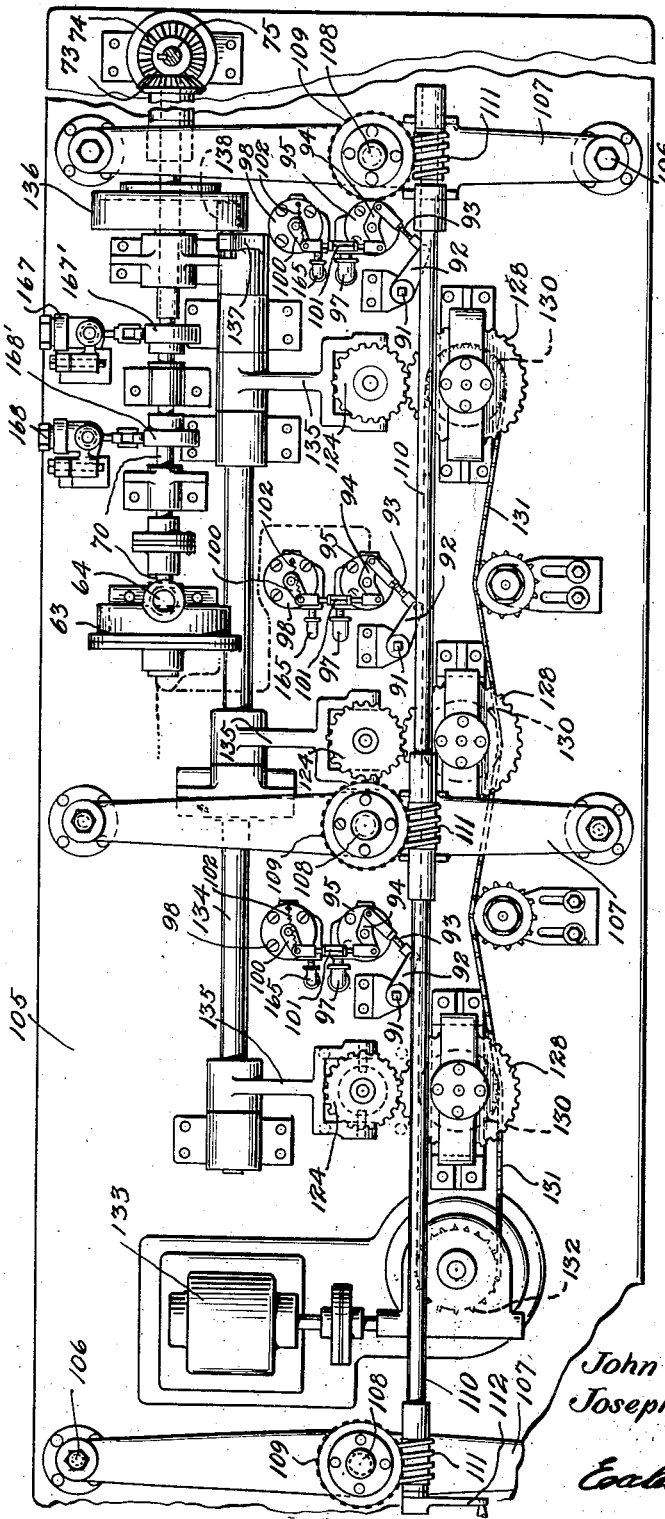

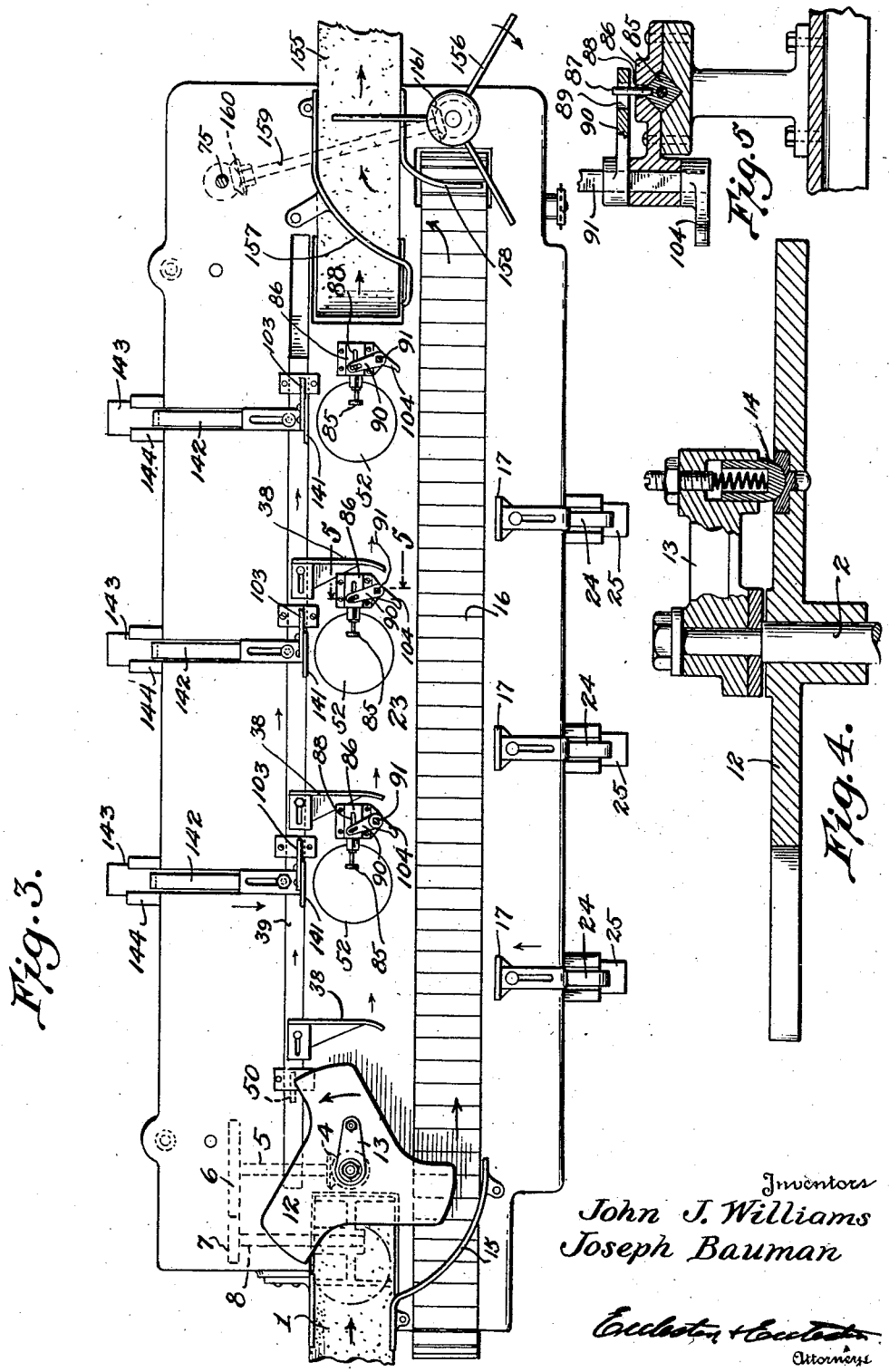

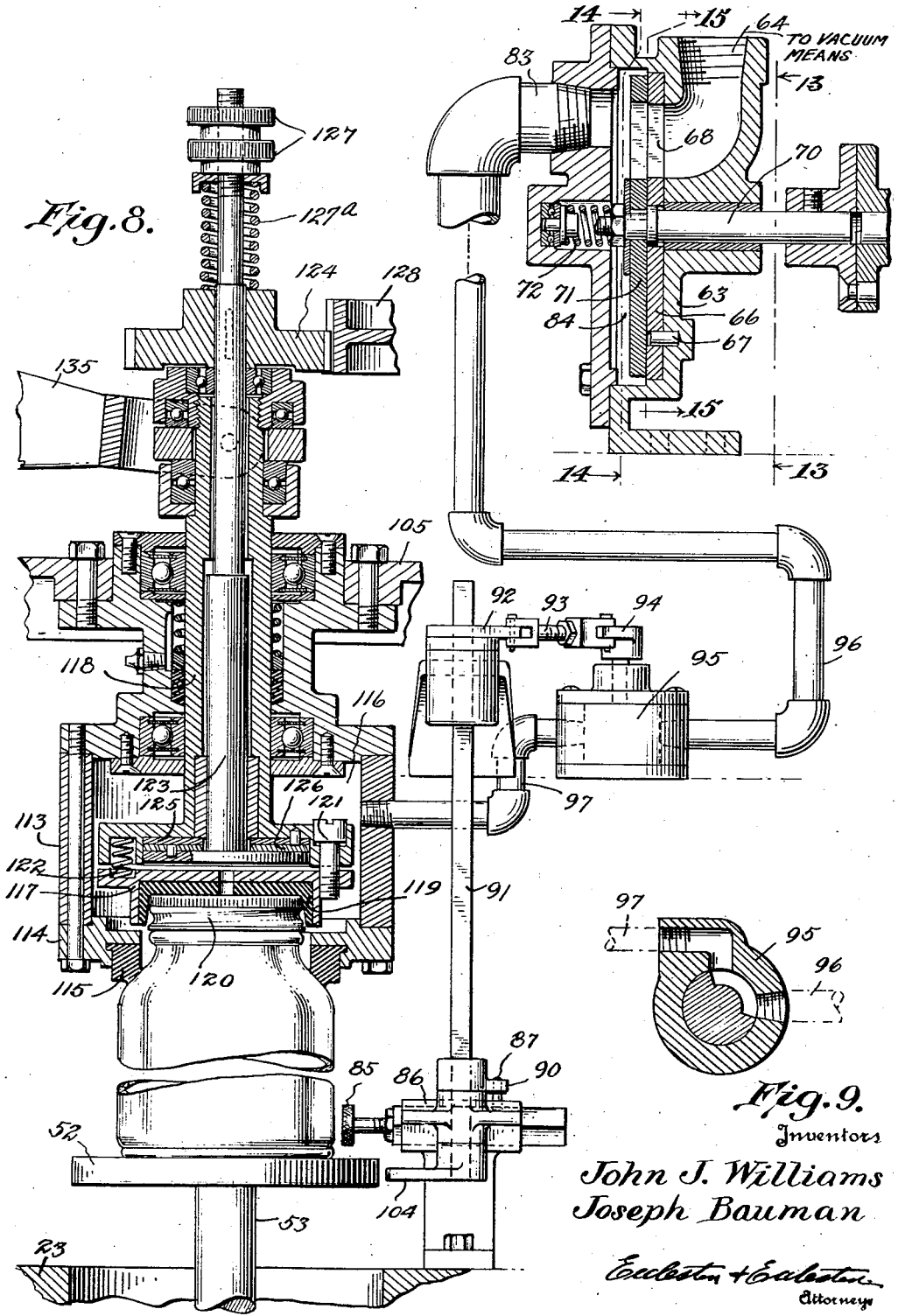

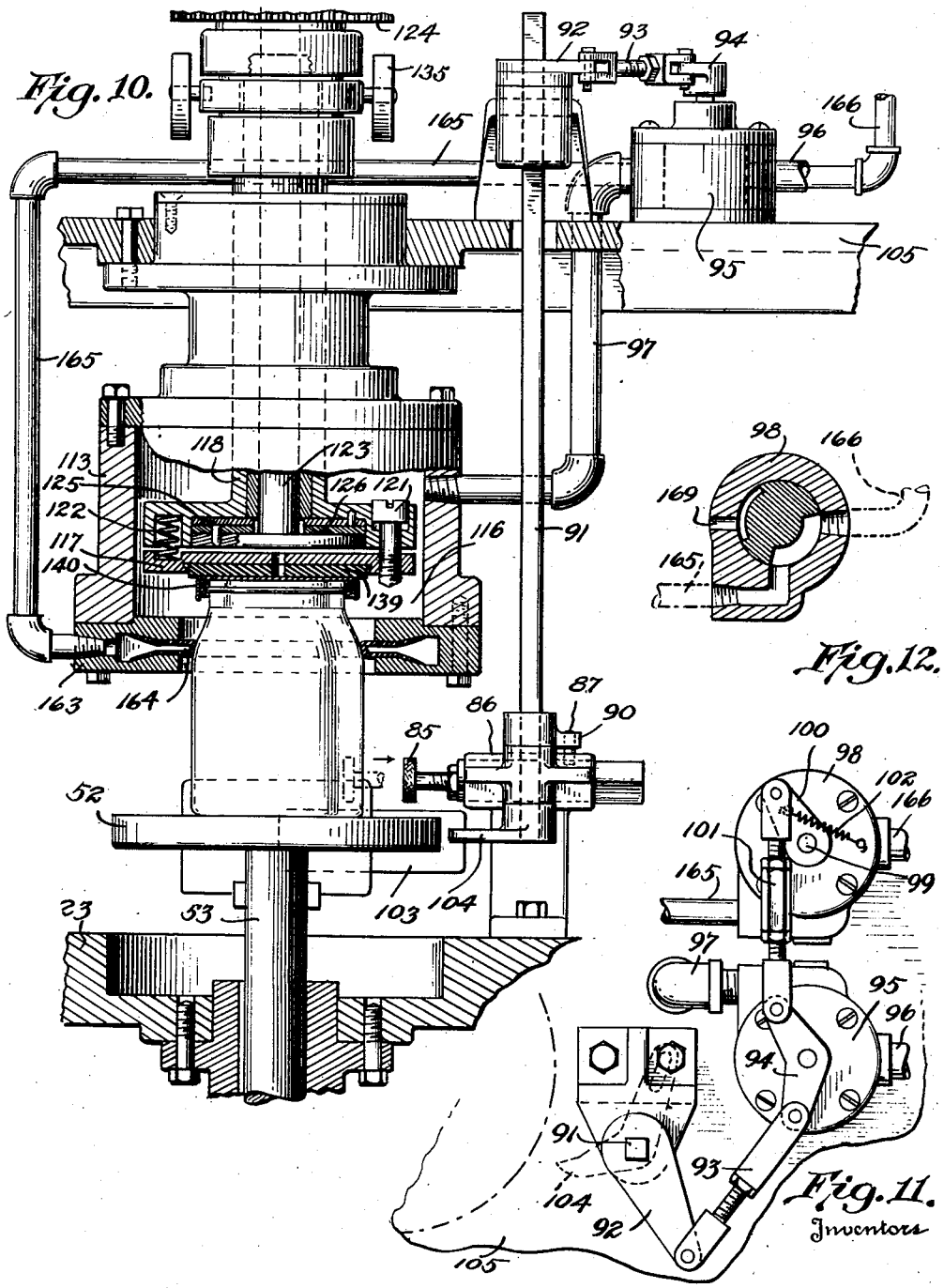

June 14, 1938.    J. J. WILLIAMS ET AL    2,120,272
VACUUMIZER
Filed July 11, 1935    8 Sheets-Sheet 8

Inventors
John J. Williams
Joseph Bauman
By
Eccleston Eccleston
Attorneys

Patented June 14, 1938

2,120,272

UNITED STATES PATENT OFFICE 2,120,272

VACUUMIZER

John J. Williams and Joseph Bauman, Wheeling, W. Va., assignors to Hazel-Atlas Glass Company, Wheeling, W. Va., a corporation of West Virginia Application July 11, 1935, Serial No. 30,930

28 Claims. (Cl. 226—82)

The invention relates to vacuumizers for glass or other containers, and particularly for the vacuumizing of containers used with closures which are rotated to sealing position.

One of the objects of the present invention is to provide a machine which will continuously, and with great rapidity, vacuumize containers and then rotate the closures to sealing position.

Another object of the invention is to provide a machine of this character which can be readily changed to vacuumize and seal containers with closures of the type which are pushed into sealing position.

A further object of the invention is to provide a machine of this character which is capable of vacuumizing containers either with or without shoulders.

A further object of the invention is to provide a machine of this character, which is capable of simultaneously vacuumizing and sealing a plurality of containers, and in which a vacuumizing head will not be thrown into communication with the source of vacuum if a container is not in position to be vacuumized by that particular head.

Numerous other objects and advantages of the invention will be apparent to those skilled in the art, from the following detailed description when taken in connection with the accompanying drawings, in which:

Figure 2 is a plan view thereof, parts being broken away.

Figure 3 is a horizontal sectional view taken on line 3—3 of Figure 1.

Figure 4 is a detail vertical sectional view of a safety device for driving the feeding member.

Figure 5 is a detail vertical sectional view taken on line 5—5 of Figure 3.

Figure 8 is a vertical sectional view of one of the vacuumizing and sealing heads, and parts associated therewith for controlling the vacuum, some of the parts being shown in elevation.

Figure 9 is a horizontal sectional view of one of the individual vacuum valves.

Figure 10 is a view similar to Figure 9 but showing the apparatus as particularly adapted to the vacuumizing of containers without shoulders.

Figure 11 is a detail plan view of the vacuum valve and air valve operating mechanism.

Figure 12 is a horizontal sectional view of one of the individual air valves.

Figure 1:
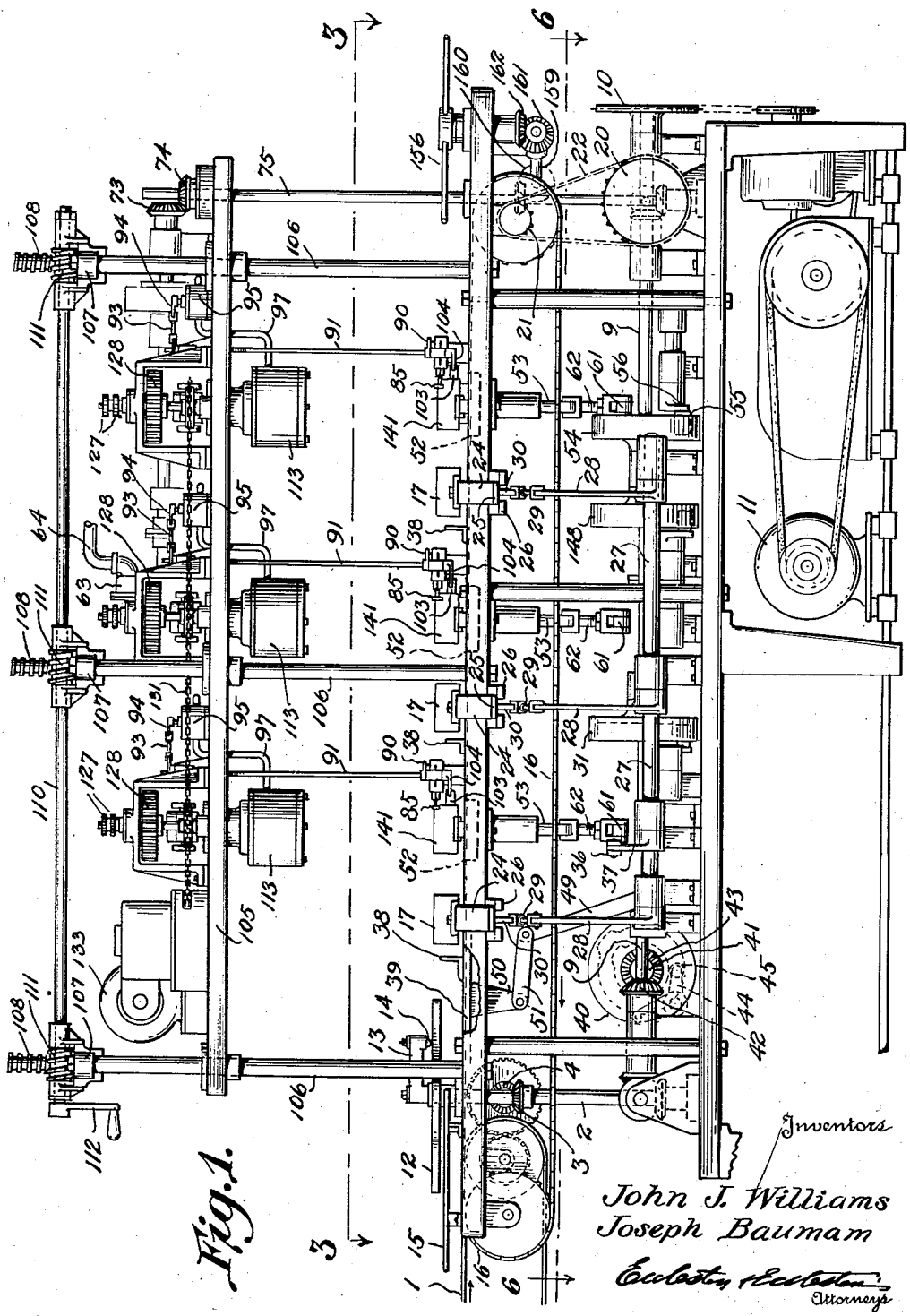
Figure 1 is a side elevational view of the apparatus.
Figure 6:
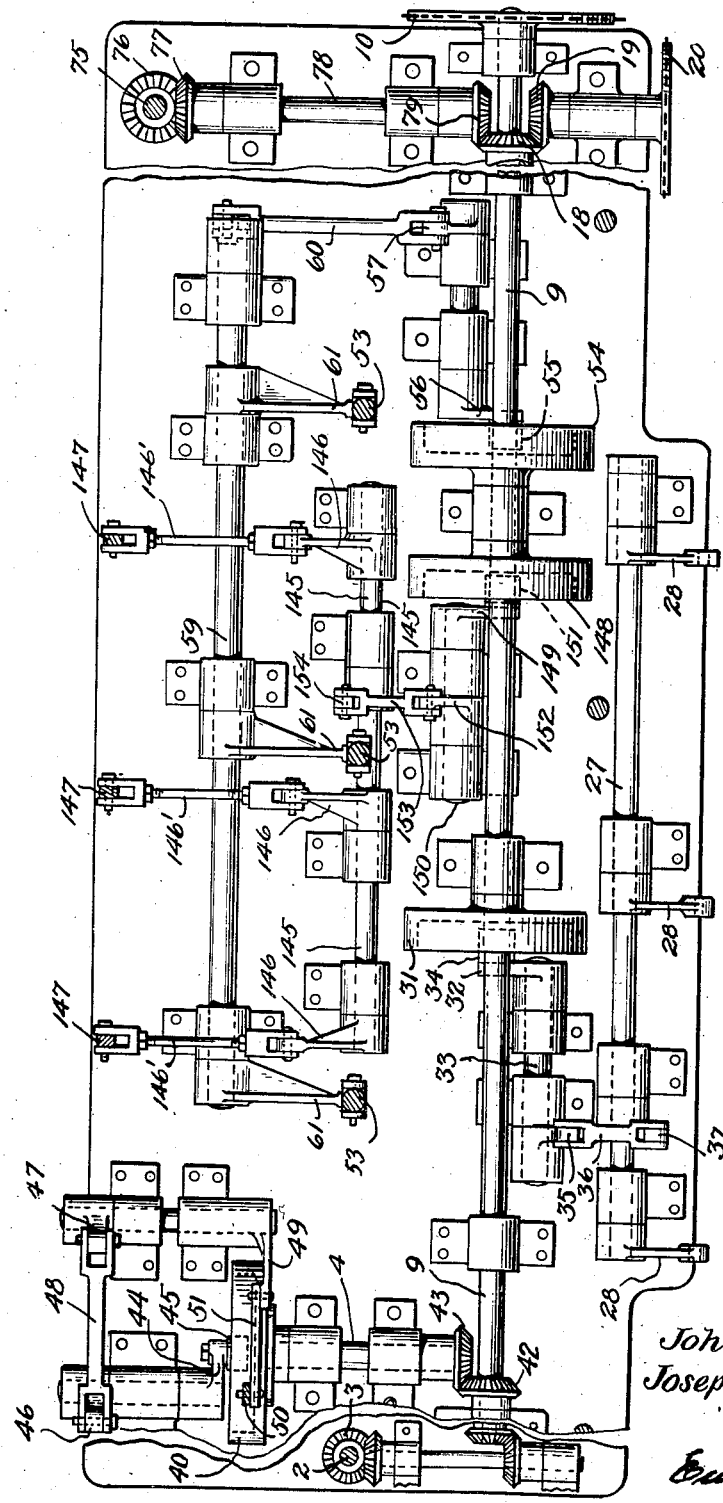
Figure 6 is a horizontal sectional view of the apparatus, taken on line 6—6 of Figure 1.
Figure 7:
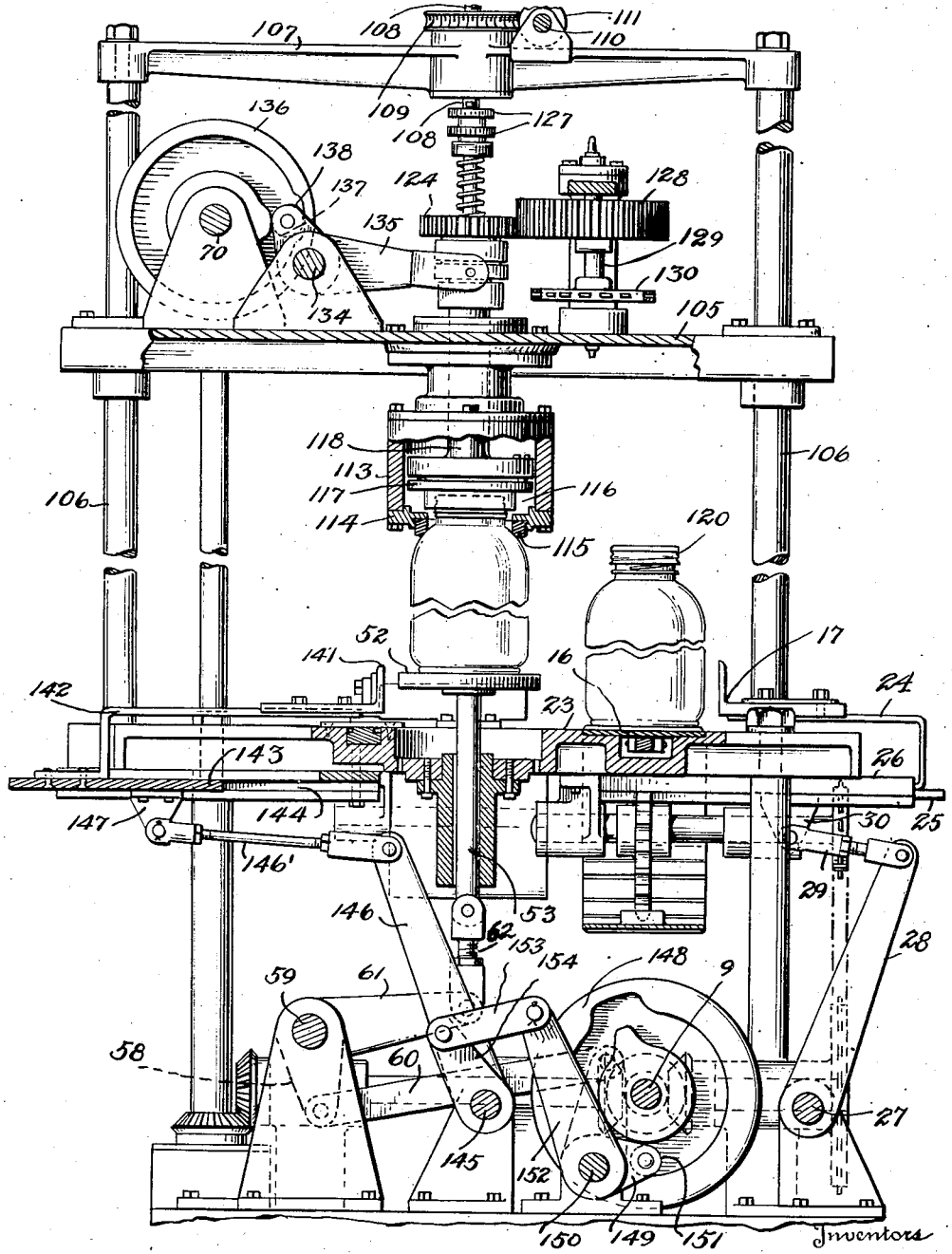
Figure 7 is a vertical transverse sectional view of the apparatus.
Figure 13:
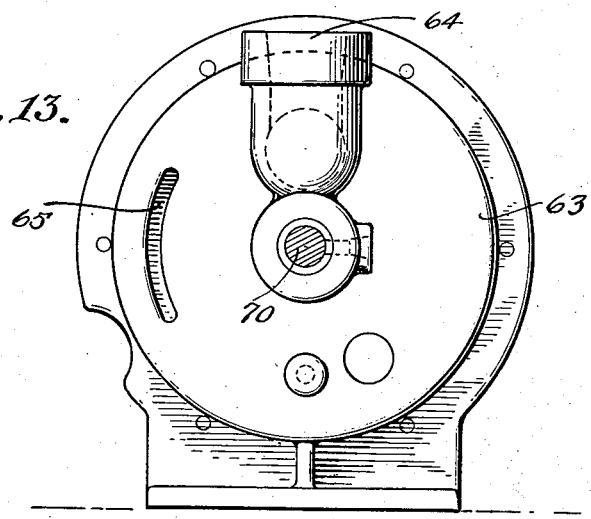
Figure 13 is a rear view of the master vacuum valve.

The machine is associated with the packing plant conveyer line, between the filling machine and the packing table, so that the filled packages, to which the closures have been loosely applied, will be vacuumized, sealed in a vacuum, and delivered to the packing table, without any hand labor being required.

Numeral 1 refers to a conveyer which carries the filled containers from the filling machine to the vacuumizer. This conveyer is preferably continuously moving, and in the specific form illustrated it is driven by the motor which operates the vacuumizer. Numeral 2 refers to a vertical shaft, provided with a bevel gear 3 meshing with bevel gear 4 on a horizontal shaft 5. This shaft 5 carries a gear 6 meshing with gear 7 on a shaft 8 which continuously drives the conveyer 1. The shaft 2 is continuously rotated, through suitable bevel gearing, by shaft 9, which is the main shaft of the machine, and which in the present form is provided with a sprocket 10 driven, through suitable reduction gearing, by a motor 11.

Numeral 12 refers to a feed or placer wheel which is loosely mounted on the shaft 2, and which is driven by an arm 13. By reference to Figure 4 it will be noted that the arm is provided with a spring-pressed finger 14 which engages a depression in the feed wheel. The continuously rotating feed wheel engages packages on the conveyer 1 and transfers the packages, in cooperation with the guide 15, to the upper run of the continuously travelling belt conveyer 16. If for any reason a package should become jammed while in the wheel, the spring-pressed finger 14 will ride out of the depression, thereby stopping further rotation of the feed wheel, while the shaft 2 continues to rotate, so that any breakage of parts is prevented. As soon as the offending package is removed the feed wheel will resume normal operation.

The feed or placer wheel 12 and belt conveyer 16 are so geared that the packages placed on the conveyer will have their centers spaced apart exactly the distance between the centers of the feed slides 17, which are associated with the conveyer. The conveyer is driven continuously from the main shaft 9, as by means of bevel gears 18, 19, sprocket wheels 20, 21, and sprocket chain 22.

In the specific form of the apparatus illustrated, there are three of the feed slides 17, equally spaced along the belt conveyer 16, but of course a greater or lesser number of these feed slides could be employed. The purpose of the slides is to push the packages from the conveyer onto a plate or table 23, and the slides are timed to operate just as three packages reach a point directly in front of the three slides. The slides are returned to their original position in time to clear the next oncoming packages.

Each of these feed slides 17 is carried by a bracket 24 which projects downwardly and is attached to a plate 25 slidably mounted in guide rails 26. Numeral 27 refers to a rockable shaft, to which are fixed three crank arms 28, one for each of the feed slides 17. An adjustable link 29 connects the upper end of each crank arm with a lug 30 projecting downward from the plate 25. Thus when the shaft 27 is rocked in one direction the feed slides will push the three packages which are aligned therewith, from the conveyer 16 onto the plate or table 23, and when the shaft is rocked in the opposite direction the slides will be drawn back to their original position, out of the path of the oncoming packages. For the purpose of rocking this shaft 27, in timed relation with the other parts, there is provided a cam 31 fixed to the continuously rotating shaft 9. A crank 32, fixed to a stub shaft 33, carries a roller 34 which travels in an appropriate groove in the cam 31. Fixed to this stub shaft is another crank 35 which is connected, by means of a link 36, with the upper end of a lever 37 fixed to the shaft 27 which carries the three crank arms 28. Thus the continuously rotating cam 31 causes the feeder slides 17 to be moved back and forth at the proper times; the contour of the cam groove being such that the slides are normally in their withdrawn position, and are in their extended feeding positions for brief intervals only, so that the slides do not interfere with the oncoming packages.

As stated hereinbefore one rotation of the feeder or placer wheel 12, positions three packages on the continuously travelling belt 16, in properly spaced relation, so that they will simultaneously align with the three feeder slides 17; and one rotation of the cam 31 operates these slides to deliver the three packages from the conveyer to the plate or table 23, and return the slides to their normal position.

When the packages are delivered to the table 23, each of the packages is in advance of one of three placer bars 38. These placer bars are adjustably mounted on a reciprocable plate 39. This plate is reciprocated at the proper intervals by means of a continuously revolving cam 40 fixed to a shaft 41, which is driven from the main shaft 9 by means of bevel gears 42 and 43. Numeral 44 refers to a crank carrying a roller 45 which rides in the cam groove. This crank operates a crank 46 which is connected with another crank 47 by means of a connecting rod 48. Crank 47 operates a crank 49 which is connected with a lug 50 depending from the reciprocable plate 39, by means of a connecting rod 51. Thus for each revolution of the cam 40 the placer bars 38 are caused to move forward and back. These bars remain in their forward position only momentarily, and are withdrawn to their normal position, where they are out of the way of the next set of packages delivered by the feeder slides 17.

When the placer bars are moved forward they push the packages, which have been placed in front of them by the feeder slides 17, onto the three raiser discs 52. The arrangement is such that the articles are centered on these raiser discs, and if the articles are not correctly centered, or if different size articles are to be handled, the proper correction is made by adjusting the placer bars 38 along the reciprocable plate 39.

The function of the raiser discs 52 is to elevate the packages into cooperative position with respect to the vacuum heads, which will be described hereinafter. The discs are mounted on rods 53, and the rods are raised and lowered at the proper times, by means of a continuously revolving cam 54 mounted on the shaft 9. A roller 55, carried by a crank 56, rides in the cam groove, and this crank operates a crank 57. Crank 57 is connected with a crank 58 fixed to a shaft 59, by a connecting rod 60, and this shaft carries three cranks 61 connected to the rods 53 by means of adjustable links 62. Thus the shaft 59 is rocked in one direction, at the proper time, to elevate the packages into cooperative relation with the vacuum heads, so that the packages can be vacuumized and sealed; and at the proper time the shaft is rocked in the opposite direction to lower the sealed packages to their original position, ready to be removed.

Before describing the vacuum and sealing heads, we shall first describe the control of the vacuum and the means for preventing a vacuum head from being opened into communication with the source of vacuum, if a package to be vacuumized is not presented to that particular head. Numeral 63 refers to the casing of a vacuum regulator valve, having a port 64 communicating with a vacuum pump (not shown) or other source of vacuum. The casing is also provided with a circumferentially arranged vent opening 65. Mounted loosely on a shaft 70, in the casing, is a fixed disc 66, secured against rotation by a pin 67 mounted in the disc and casing. This fixed disc is provided with a port 68, in alignment with the port 64 of the casing, and also with a circumferentially arranged vent opening 69, aligned with the vent 65 in the casing.

Also arranged in the casing, in abutting relation with the disc 66, is a rotating disc 71; the two discs being held against each other by a compression spring 72. This disc 71 is fixed to the shaft 70, which shaft is continuously rotated by means of a bevel gear 73 meshing with bevel gear 74 fixed to a vertical shaft 75. Another bevel gear 76, mounted on the lower end of the shaft 75, meshes with a bevel gear 77 fixed to one end of a horizontal stub shaft 78. The opposite end of the stub shaft is provided with a bevel gear 79 meshing with bevel gear 18 fixed to the main drive shaft 9.

The continuously revolving disc 71 is provided with a large port 80, with a plurality of ports 81 gradually increasing in size toward the port 80, and with a circumferentially arranged vent opening 82. Leading from the valve casing is a vacuum line 83 which communicates with each of the vacuum-heads, in a manner to be shortly described.

Figure 14:
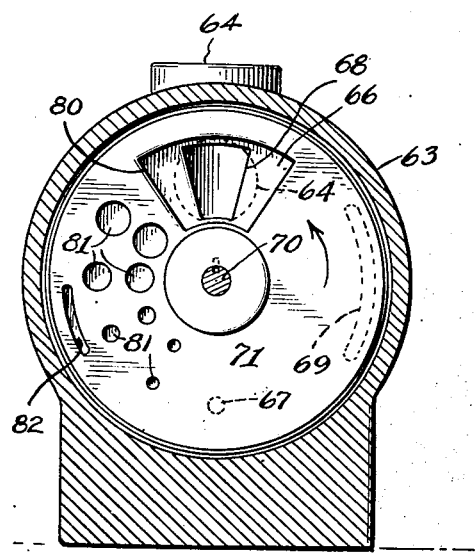
Figure 14 is a front vertical sectional view of this valve.
Figure 15:
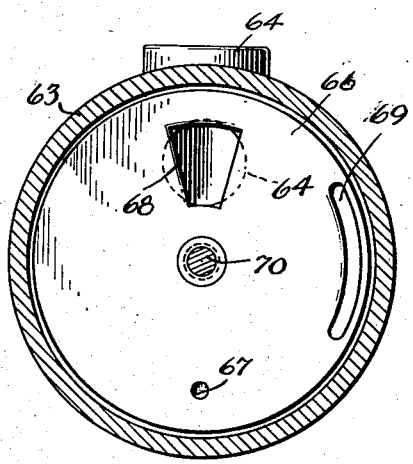
Figure 15 is a view similar to Figure 14, but with the revolving disc removed.

When vacuumizing heavy products, such as liquids, candy, etc., containing a small amount of air at the start, the communication between the vacuum pump and the vacuum head can be opened to its full capacity quickly, allowing the air to be exhausted as quickly as the capacity of the pump will permit, without lifting or violently disturbing the contents of the package. This is known as flash vacuum. But when a lighter product is being treated, containing a large amount of air, such as coffee, malted milk powder, etc., if the air is exhausted too quickly it results in a part of the contents being lifted from the package and being deposited on the sealing surface of the glass or other container, thereby causing the package to leak and partially or entirely destroying the vacuum. The specific embodiment of the invention illustrated herein, is particularly adapted for the packing of light products such as coffee, and therefore the vacuum is applied gradually. By reference to Figure 14 it will be noted that the revolving disc 71 travels in the direction of the arrow, and that the ports 81 gradually increase in size toward the port 80. Hence the small ports 81 first align with the port 68 in the stationary disc, thereby permitting a slight application of the vacuum, and as the rotation of the disc 71 continues the larger ports align with the port 68 and finally the port 80 aligns with the port 68, permitting the air to be exhausted at full capacity.

The continued rotation of the disc 71 carries the port 80 beyond the port 68 and the disc 71 thereby closes the port 68 and shuts off all communication between the vacuum pump and the containers being vacuumized. The disc continues to rotate and the vent opening 80 in the disc 71 aligns with the vent 69 in the stationary disc 66, which latter vent is in fixed alignment with the vent 65 in the valve casing. Thus communication is opened with the atmosphere, and the air passes through the vents, through the space 84 (Figure 8) in the valve to the pipe 83 and thence to the vacuum heads. Of course before this happens the packages have been sealed, as will be described hereinafter. It will be understood, of course, that different discs 71, having different sizes of ports or different arrangements of ports, can be substituted for the one illustrated herein, depending upon various conditions, the particular product being treated, etc. Also, in some instances it may be desirable to employ other stationary discs having ports of sizes different from those illustrated herein.

In a machine of the character illustrated herein, where a plurality of packages are being simultaneously vacuumized, it is apparent that if a package was not presented to one of the vacuum heads, and that head was in the operation of the machine thrown into communication with the source of vacuum by the normal operation of the vacuum regulator valve, that it would result in a large amount of air being admitted to the vacuum line, from the open head. This would result in the application of a greatly reduced vacuum in the packages being vacuumized by the other heads. By means of a construction, which will now be described, a vacuum head is not opened to communication with the source of vacuum if a package is not presented to that particular head, by which arrangement it is possible to obtain the same degree of vacuum with one or two packages in the machine, as with three packages in the machines.

Located adjacent each raiser disc 52, at a point slightly above the upper limit of travel of the raiser discs, is a finger 85. This finger is slidably mounted in a housing 86. When a package is positioned on a raiser plate or disc 52, by the placer bars 38, the package will contact with the finger 85 and move it to the right. The finger carries a pin 87 which projects upwardly through a slot 88 in the top of the housing 86, and engages in a slot 89 in a crank 90 fixed to the lower end of a shaft 91. The upper end of this shaft is provided with a crank 92 connected, by means of an adjustable link 93, with one arm of a bell crank lever 94. This bell crank lever is mounted on the shaft of a valve 95, shown in section in Figure 9, and termed herein individual safety vacuum valves. There are, of course, three of these individual valves, one for each vacuum head, and each valve has a pipe 96 communicating with the main vacuum regulator line 83 which leads to the vacuum regulator valve 63, and a pipe 97 communicating with the vacuum head.

When the finger 85 is moved to the right, by the delivery of a package to its raiser disc or plate 52, the shaft 91 is turned, thereby turning the valve to the position shown in Figure 9, so that communication is opened between that particular vacuum head and the vacuum regulator valve, and when the rotation of the disc 71 opens communication with the source of vacuum, the package will be vacuumized. If no package had been delivered to the particular raiser plate, then the finger 85 would not have been moved to the right and the particular individual safety vacuum valve would remain closed, so that there would be no communication between the particular vacuum head and the source of vacuum, when the disc 71 is rotated to open position. It is thus apparent that no vacuum head will communicate with the source of vacuum unless a package is delivered to the head, and hence the packages will be vacuumized to the same degree, whether one, two or three packages are delivered.

It was stated above that a package delivered to a raiser plate 52 moves the finger 85 to the right, but in the specific embodiment illustrated the finger is moved only part way to the right by the package, and further movement of this finger and the shaft 91 is effected by the action of a spring. This is best illustrated in Figure 11. In addition to the individual vacuum safety valves 95, there are also individual air valves 98. The purpose of these air valves will be described hereinafter. The shaft 99 of each air valve carries a crank 100, which is connected by means of a turnbuckle 101, with one arm of the bell-crank lever 94. A coil spring 102 tends to draw the crank 100 to the right (Fig. 11) after the crank passes dead center. When the finger 85 is moved to the right to partly rotate shaft 91 and bell-crank lever 94, it also partly rotates the crank 100, and thereafter the spring 102 continues the turning movement to properly position the valves. After the packages have been vacuumized and the raiser plates 52 have been lowered to the plane of the table, the valves are returned to their original positions by lugs 103 engaging dogs 104 fixed to the shafts 91. Of course this return movement of the shafts 91 causes the fingers 85 to be moved to the left to their original positions, ready to be engaged by the next packages delivered to the raiser plates 52. The means for moving the lugs 103 will be described hereinafter.

The delivery of the packages to the raiser plates, the means for raising and lowering these plates, and the means for regulating and controlling the application of the vacuum to the vacuum heads, have been described, and we shall now describe the vacuum and sealing heads and associated parts.

Numeral 105 refers to a frame which is vertically adjustable, and which carries various parts, now to be described. In the specific embodiment illustrated, this frame is slidably mounted on three pairs of pedestals 106, each pair being connected at their upper ends by fixed cross-heads 107. Extending downwardly from the central portion of each cross-head is a rod 108 which has its lower end attached to the frame 105. Threaded on the upper portion of each rod 108, above the cross-heads, is a worm wheel 109, and a horizontal shaft 110 carries three worms 111 meshing with the three worm wheels. This shaft is provided with an operating crank 112, and it is apparent that by rotating this crank in the proper direction the frame 105 can be raised or lowered to the desired extent.

Mounted on and extending downwardly from this frame 105 are three vacuum heads 113. These heads are stationary, but their vertical position can be adjusted by the adjustment of the frame 105. Removably mounted on the lower end of each head is an annular flange member 114, carrying a rubber sealing gasket 115. When the raiser plates are elevated, as hereinbefore described, the packages are elevated a sufficient distance to bring the shoulder of the package into contact with the rubber gasket, which is compressed, thereby sealing off the vacuum chamber 116 in the vacuum head. If a good seal is not obtained, it is only necessary to operate the crank 112 to raise or lower the vacuum heads the desired amount, to give a proper seal. And, of course, the vacuum heads are also adjusted to the proper vertical plane when containers of a different height are to be vacuumized. The containers having been elevated into sealing relation with respect to the vacuum heads, the heads are thrown into communication with the source of vacuum, in the manner hereinbefore described, to vacuumize the containers. It will be understood, of course, that the closures are loosely mounted on the containers while the containers are being vacuumized, and that the closures are moved to sealing position thereafter, while the vacuum heads and containers are still under vacuum. We shall now describe the means for moving the closures to sealing position while still under vacuum, and while the description will relate particularly to screw caps, yet it will be clear that the machine is readily adaptable to the push-on types of closures.

Numeral 117 refers to a sealing chuck carried by a hollow sleeve 118, and mounted within the sealing chuck is a rubber cup 119, which is adapted to frictionably engage the closure 120, when the chuck is moved down to operative position. It should be mentioned here that while the container is being vacuumized it is undesirable for the closure, which is loosely mounted on the container, to engage any of the parts, and in accordance with the present invention the closure, after the package has been elevated into sealing position with respect to the vacuum head, is not in engagement with the rubber cup 119 or other parts. In Figures 8 and 10, the closure is shown as engaged by the sealing chuck 117, but these figures illustrate the positions of the parts after the container has been vacuumized and the sealing chuck has been moved downward to engage the closure.

The sealing chuck 117 is shown as resiliently mounted on the sleeve 118 by means of screws 121 and springs 122. This resilient mounting compensates for any slight variations in the height of the container, and will insure a proper gripping of the closure by the rubber cup 119. The sealing chuck 117 is continuously rotated by chuck spindle 123, as will be described shortly. In order to make certain that the closure will be properly tightened, it is desirable to give more rotation to the chuck spindle than is actually needed to turn the closure to proper sealing position. In the present embodiment the spindle makes one complete rotation while the chuck is in engagement with the closure, and as the closure is already partly screwed on the container, this will be a further rotation than is necessary to turn the closure to sealing position. Consequently, if the sealing chuck were positively driven it would result in stripping the threads of the closure, or there would be excessive slipping of the rubber cup on the closure, thereby causing the cup to wear quickly. In order to prevent these undesirable conditions, a friction clutch is provided between the sealing chuck and the gear 124 which is keyed to the chuck spindle. Numeral 125 indicates a friction disc which is maintained in fixed relation with respect to the chuck, and numeral 126 indicates a friction disc which is maintained in fixed relation with respect to the spindle; the two friction discs being maintained in contacting relation by a spring 127a. When the closure has been turned far enough to give a proper seal the friction discs will slip upon each other until the chuck is lifted. It is desirable, of course, to adjust the friction clutch, and this is accomplished by adjusting the nuts 127, threaded on the upper end of the spindle 123, either up or down, to increase or decrease the force required to cause slippage between the friction discs.

As stated hereinbefore the sealing chuck 117 is continuously rotated. In the form illustrated the rotation is effected by a gear 128 which meshes with the gear 124 keyed to the spindle 123, and it will be noted, by reference to Figure 8 that the gear 128 is of considerably greater thickness than the gear 124, which permits these gears to remain in mesh when the sealing chuck is raised and lowered, by means to be described hereinafter. The three gears 128 are keyed to stub shafts 129, which shafts also have keyed thereto sprocket wheels 130. A sprocket chain 131 engages the three sprocket wheels 130, and this chain is driven by a sprocket wheel 132, which is continuously rotated by a motor 133 mounted on the frame 105. It is thus apparent that the sealing chucks are continuously rotated while in their upper and lower positions and while being raised and lowered, and we shall now describe the means for raising and lowering the chuck during the continued rotation thereof.

Numeral 134 refers to an oscillatable shaft carrying three crank arms 135, and the ends of these arms are pivotally connected with the sleeves 118 carrying the sealing chucks 117. The shaft is rocked at the proper times by means of a cam 136 mounted on the continuously rotating shaft 70, referred to hereinbefore; the connection between the cam and the oscillatable shaft 134 consisting of a crank 137 mounted on the shaft 134 and provided with a roller 138 travelling in the cam groove. While we have particularly described means for rotating the cap to sealing position, it is to be understood that one of the important features of the invention is that the machine can be used for vacuumizing and sealing containers with either screw caps or other caps which are rotated to sealing position, or with caps of the push-on type. We have already described how containers are vacuumized and sealed with screw caps or other caps which are rotated to sealing position, and it will be understood that when the machine is to be shifted from the sealing of containers with such closures to the sealing of containers with push-on closures, it is only necessary to shut down the motor 133, thereby stopping the rotation of the sealing chucks. The downward movement of the chucks, after the containers have been vacuumized, will force the push-on closures downward into sealing position. When push-on closures are being used it may sometimes be desirable to substitute for the rubber cups 119, flat rubber discs 139, as shown in Figure 10, which figure also illustrates a push-on type of closure, referred to by numeral 140.

The containers having been elevated by the raiser plates 52 into sealing relation with the rubber gaskets 115, and having been vacuumized and sealed, and the vacuum chamber having been opened to atmosphere, in the manner described, the raiser plates are now lowered by the operation of the cam 54, to return the packages to the level of the plate or table 23.

The vacuumized and sealed containers are now ready to be delivered from the machine, and the preferred mechanism for effecting the delivery will now be described.

Numeral 141 refers to three discharge slides which are in alignment with the packages on the raiser plates, and which push the completed packages back onto the continuously travelling conveyer 16. Each of these discharge slides is carried by a bracket 142 which projects downwardly and is attached to a plate 143 slidably mounted in guide rails 144. A rockable shaft 145 carries three crank arms 146, one for each of the discharge slides, and an adjustable link 146' connects the upper end of each crank arm with a lug 147 projecting downwardly from the plate 143. Thus when the shaft 145 is rocked in one direction the discharge slides will push the three vacuumized and sealed packages from the raiser plate onto the continuously travelling conveyer 16, and when the shaft is rocked in the opposite direction the discharge slides will be returned to their original positions, out of the path of the next set of packages to be delivered to the raiser plates by the placer bars 38. It will be noted that the discharge slides 141 carry the lugs 103. During the movement of the discharge slides to deliver the sealed packages from the raiser plates to the conveyer 16, these lugs engage dogs 104 fixed to the shafts 91, thereby closing the individual vacuum safety valves 95 until other packages have been delivered to the raiser plates, as described hereinbefore. For the purpose of rocking the shaft 145 to operate the discharge slides in timed relation with the other parts there is provided a cam 148 fixed to the continuously rotating shaft 9. A crank 149 fixed to stub shaft 150 carries a roller 151 which travels in the cam groove. Fixed to this stub shaft is another crank 152 which is connected, by means of a link 153, with the upper end of a lever 154 fixed to the shaft 145, which shaft carries the three crank arms 146. Thus the continuously rotating cam 148 causes the discharge slides 141 to be moved back and forth at the proper times, the contour of the cam groove being such that the slides are normally in their withdrawn position, and are in their discharging positions for brief intervals only, so that there is no interference with the delivery of the next set of packages to the raiser plates.

The vacuumized and sealed packages are now on the conveyer 16 being carried forward toward the packing table. As each package approaches the end of the conveyer 16 it is transferred to a conveyer 155 leading to a packing table (not shown), by means of a continuously revolving pin wheel 156, and cooperating guide rails 157 and 158. The pin wheel is continuously rotated, in timed relation with the other parts of the machine, by means of a shaft 159 having a bevel gear 160 on one end thereof meshing with a bevel gear on the shaft 75, and having another bevel gear 161 on its opposite end meshing with a bevel gear 162 mounted on the shaft of the pin wheel.

The delivery of the vacuumized and sealed packages from the conveyer 16 to the conveyer 155 leading to the packing table, completes a cycle of operation, and of course the cycle is repeated, with the machine performing the various operations in the order named, as long as packages are placed on the intake conveyer 1 leading from the filling machine. The operation of the machine has been fully described in connection with the description of the construction thereof, and further description of the operation is therefore unnecessary.

The construction hereinbefore described is particularly for vacuumizing and sealing containers having shoulders, which shoulders cooperate with the rubber gasket 115 to seal off the vacuum chamber, when the containers are in elevated position. But by a very slight change the machine is adapted to the vacuumizing and sealing of straight side containers or containers having very slight shoulders. In other words, the machine is adapted to vacuumize and seal any and all types of containers. In order to adapt the present machine to operate upon containers without shoulders, it is only necessary to remove the flange member 114 carrying the sealing gasket, and substitute another flange member 163, illustrated in Figure 10. This flange member carries a flexible rubber tube 164, which is inflated at the proper time to force it tightly against the wall of the container, thereby sealing off the vacuum chamber 116, as shown in Figure 10. We shall now describe the preferred means for inflating the flexible rubber sealing tube, and the means for preventing the admission of air to the tube in the event a container is not presented to the particular vacuum head. Numeral 165 indicates an air line leading from the flange member 163 to the individual air valve 98, referred to hereinbefore. There is one of these valves for each of the three vacuumizing and sealings units, and of course there are three of the air lines 165 leading from each air valve to each member 163. And an air line 166 leads from the individual air valves to the poppet valves 167 and 168, which valves are operated at the proper times by cams 167' and 168' respectively. These cams are mounted on shaft 70 which, as previously described, is continuously rotating. Poppet valve 167 communicates with any desired source of air under pressure, and poppet valve 168 is a vent valve. The arrangement is such that when valve 167 is opened to inflate the sealing tube 164, the vent valve 168 is closed, and when the sealing tube is to be deflated, the vent valve is opened and the air valve is closed. Of course the cams 167' and 168' which operate these valves, are adjustable to cause inflation and deflation at the proper instants.

If the sealing tube 164 should be inflated when a container was not presented to the particular vacuum head, the sealing tube might be blown from its flange member 163. In accordance with the present invention this is prevented by means of the individual air valves 98. We have previously described how the placing of a container on a raiser plate 52 operates the finger 85 to open the individual vacuum valve; and we have also described the connections between the individual vacuum valve and its associated individual air valve, whereby the operation of the finger 85 to open the individual vacuum valve also causes the individual air valve to be opened, as illustrated in Figure 11. An individual air valve 98, in open position, is shown in Figure 12. When the valve is in this position, the opening of the poppet valve 167 causes the flexible sealing tube 164 to be inflated. If no container is placed on the particular raiser plate the individual air valve 98 remains closed, and hence the compressed air does not reach the sealing tube when the air poppet valve 167 is opened. The individual air valves 98 are preferably provided with a vent 169, so that when the valve remains closed because of the absence of a container to be sealed, if there is any leakage to the sealing tube the vent will allow the air to escape before sufficient pressure is built up to blow the tube from its holding member 163.

When the machine is to be returned to the vacuumizing and sealing of shouldered containers the air is shut off, the flange member 163 is removed, and the flange member 114 holding the gasket 115, is substituted.

It will be apparent from the foregoing description that the machine will operate at a very high rate to efficiently vacuumize and seal shouldered containers with screw caps or any other type of cap which is rotated to sealing position; that it will operate in the same manner with any type of push-on or friction caps, by merely shutting down the motor 133; that it will operate in the same manner with straight side containers or other types of containers by substituting for the gasket 115 the flexible tube 164; that any particular vacuum head will not be opened to communication with the source of vacuum if a container is not presented to that particular vacuum head; that any particular sealing tube 164 will not be inflated if a container is not presented to that particular vacuum head; that all of the parts operate in the proper timed relation to produce the desired operation, the various cams or other timing elements being adjustable for that purpose; and that the machine is continuous in its operation, a set of containers being carried forward and transferred to position to be delivered to the raiser plates, while one set of containers is being vacuumized and sealed, and while containers which have already been vacuumized and sealed are being carried on toward the packing table. It is unnecessary to point out here the many other advantages of the invention, which will be apparent at once to those skilled in the art.

While the preferred embodiment of the machine has been described in considerable detail, yet it will be understood that many changes and modifications may be made without departing from the spirit of the invention, and all such changes and modifications are intended to be included within the scope of the appended claims.

What we claim is:

1. An apparatus for vacuumizing and sealing containers, including a belt conveyer, a plurality of raiser plates, spaced members for simultaneously initiating the delivery of a plurality of containers from said conveyer to said raiser plates, the containers adapted to have closures loosely mounted thereon, a plurality of vacuum heads, means for simultaneously operating the plurality of raiser plates to lift the containers into sealing relation with the vacuum heads, means for vacuumizing the containers, means for moving the closures to sealing position while the containers are vacuumized, and means for returning the containers to the conveyer at points spaced laterally of said spaced members.

2. An apparatus for vacuumizing and sealing containers, including a belt conveyer, a plurality of plates, spaced members for simultaneously initiating the delivery of a plurality of containers from said conveyer to said plates, the containers adapted to have closures loosely mounted thereon, a plurality of vacuum heads, means for causing relative movement between the vacuum heads and plates to simultaneously bring the plurality of containers into sealing relation with the vacuum heads, means for vacuumizing the containers, means for moving the closures to sealing position while the containers are vacuumized, and means for returning the containers to the conveyer at points spaced laterally of said spaced members.

3. An apparatus for vacuumizing and sealing containers including a belt conveyer, a plurality of plates, spaced members for simultaneously initiating the delivery of a plurality of containers from said conveyer to said plates, the containers adapted to have closures loosely mounted thereon, a plurality of vacuum heads, means for causing relative movement between the vacuum heads and plates to simultaneously bring the plurality of containers into sealing relation with the vacuum heads, means for vacuumizing the containers, means for rotating the closures to sealing position while the containers are vacuumized, and means for returning the containers to the conveyer at points spaced laterally of said spaced members.

4. An apparatus for vacuumizing and sealing containers, including a continuously moving belt conveyer, a plurality of raiser plates, spaced members for simultaneously initiating the delivery of a plurality of containers from said conveyer to said raiser plates, the containers adapted to have closures loosely mounted thereon, a plurality of vacuum heads, means for operating the plurality of raiser plates to lift the containers into sealing relation with the vacuum heads and to lower the containers out of sealing relation with the vacuum heads, means for vacuumizing the containers, means for moving the closures to sealing position while the containers are vacuumized, and means for returning the plurality of containers from the raiser plates to said continuously moving conveyer at points spaced laterally of said spaced members.

5. An apparatus for vacuumizing and sealing containers, including a belt conveyer, a plurality of feeder slides equally spaced along the conveyer, a table on the opposite side of said conveyer, a plurality of placer bars, means for operating the feeder slides to deliver a plurality of containers from the conveyer to the table in advance of the placer bars, the containers adapted to have closures loosely mounted thereon, a plurality of raiser plates, a vacuum head in vertical alignment with each raiser plate, means for reciprocating the placer bars to position the containers on the raiser plates, means for operating the raiser plates to lift the containers into sealing relation with the vacuum heads and to lower the containers out of sealing relation with the vacuum heads, means for vacuumizing the containers, and means for moving the closures to sealing position while the containers are vacuumized.

6. An apparatus for vacuumizing and sealing containers, including a belt conveyer, a plurality of feeder slides equally spaced along the conveyer, a table on the opposite side of said conveyer, a plurality of placer bars, means for operating the feeder slides to deliver a plurality of containers from the conveyer to the table in advance of the placer bars, the containers adapted to have closures loosely mounted thereon, a plurality of raiser plates, a vacuum head in vertical alignment with each raiser plate, means for reciprocating the placer bars to position the containers on the raiser plates, means for operating the raiser plates to lift the containers into sealing relation with the vacuum heads and to lower the containers out of sealing relation with the vacuum heads, means for vacuumizing the containers, means for moving the closures to sealing position while the containers are vacuumized, a discharge slide associated with each raiser plate, and means for operating the discharge slides to deliver the containers from the raiser plates to said conveyer.

7. An apparatus for vacuumizing and sealing containers, including a belt conveyer, a table extending along one side of the conveyer, a plurality of feeder slides adapted to sweep across the conveyer toward the table, a plurality of discharge slides adapted to sweep across the table toward the conveyer, the feeder slides and discharge slides arranged in staggered relation, a raiser plate in alignment with each discharge slide, a plurality of placer bars for reciprocation longitudinally of the table to position containers on the raiser plates, and a vacuum head mounted over each raiser plate.

8. An apparatus for vacuumizing and sealing screw cap containers, including a continuously moving belt conveyer, a plurality of feeder slides equally spaced along the conveyer, a table extending along the opposite side of the conveyer, means for delivering containers to said conveyer spaced the same distance apart as said feeder slides, means for simultaneously operating the feeder slides when the containers are aligned therewith, a plurality of placer bars reciprocable along the table, a plurality of raiser plates normally in substantially the plane of the table, means for operating the placer bars to position containers on the raiser plates, a vacuum head in vertical alignment with each raiser plate, means for raising and lowering the raiser plates to move the containers into and out of cooperative relation with the vacuum heads, and means for delivering the containers from the raiser plates to said conveyer.

9. An apparatus for vacuumizing and sealing containers, including a plurality of vacuum heads, a plurality of raiser plates in vertical alignment with the vacuum heads, a vacuum regulator valve, vacuum lines leading from the regulator valve to each vacuum head, a vacuum valve in each vacuum line, means for positioning containers on the raiser plates, and means individual to each raiser plate to open the individual vacuum valve by the positioning of a container on the raiser plate.

10. An apparatus for vacuumizing and sealing containers, including a plurality of vacuum heads, a plurality of raiser plates in vertical alignment with the vacuum heads, a vacuum regulator valve, vacuum lines leading from the regulator valve to each vacuum head, a vacuum valve in each vacuum line, means for positioning containers on the raiser plates, means individual to each raiser plate to open the individual vacuum valve by the positioning of a container on the raiser plate, and means for closing the individual valve when the container is removed from the raiser plate.

11. An apparatus for vacuumizing and sealing containers, including a plurality of vacuum heads, a plurality of raiser plates in vertical alignment with the vacuum heads, a vacuum regulator valve, vacuum lines leading from the regulator valve to each vacuum head, a vacuum valve in each vacuum line, and means for opening the individual valves by the delivery of containers to their associated raiser plates.

12. An apparatus for vacuumizing and sealing containers, including a plurality of vacuum heads, a plurality of raiser plates in vertical alignment with the vacuum heads, a vacuum regulator valve, vacuum lines leading from the regulator valve to each vacuum head, a vacuum valve in each vacuum line, means for opening the individual valves by the delivery of containers to their associated raiser plates, and means for closing the valves when the containers are discharged from the raiser plates.

13. An apparatus for vacuumizing and sealing containers, including a plurality of vacuum heads, a plurality of raiser plates in vertical alignment with the vacuum heads, means for simultaneously delivering containers to the raiser plates, means for operating the raiser plates to present the containers to the vacuum heads, and a movable finger associated with each raiser plate for rendering operative any vacuum head to which a container is presented, said finger being operated by the delivery of a container to a raiser plate.

14. An apparatus for vacuumizing and sealing containers, including a vacuum head, a raiser plate in vertical alignment with the vacuum head, a vacuum valve associated with the vacuum head, a shaft upon which said valve is mounted, a movable finger associated with the raiser plate, operative connections between the finger and the shaft, means for positioning a container on the raiser plate, the positioning of the container operating the finger to open the vacuum valve.

15. An apparatus for vacuumizing and sealing containers, including a vacuum head, a raiser plate in vertical alignment with the vacuum head, a vacuum valve associated with the vacuum head, a shaft upon which said valve is mounted, a movable finger associated with the raiser plate, operative connections between the finger and the shaft, means for operating the finger to open the valve by placing a container on the raiser plate, and means for closing the valve when the container is removed from the raiser plate.

16. An apparatus for vacuumizing and sealing containers, including a plurality of vacuum heads, a raiser plate in vertical alignment with each vacuum head, a vacuum regulator valve, vacuum lines leading from the regulator valve to each vacuum head, a vacuum valve in each vacuum line, a shaft for each valve, a movable finger associated with each raiser plate, operative connections between each finger and each shaft, and means for operating the finger to open the valve by placing a container on a raiser plate.

17. An apparatus for vacuumizing and sealing containers, including a plurality of vacuum heads, a raiser plate in vertical alignment with each vacuum head, a vacuum regulator valve, vacuum lines leading from the regulator valve to each vacuum head, a vacuum valve in each vacuum line, a shaft for each valve, a movable finger associated with each raiser plate, operative connections between each finger and each shaft, means for operating the finger to open the valve by placing a container on a raiser plate, and means for closing the valve when a container is removed from a raiser plate.

18. An apparatus for vacuumizing and sealing containers, including a vacuum head, means for bringing a container into cooperative relation with the vacuum head, a flexible tubular member for engaging the container and sealing off the vacuum chamber when the tubular member is inflated, means for admitting pressure to the tubular member periodically, and means for preventing inflation of the tubular member if a container is not presented to the vacuum head.

19. An apparatus for vacuumizing and sealing containers, including a vacuum head, a raiser plate for elevating a container into cooperative relation with the vacuum head, a flexible tubular member for engaging the container and sealing off the vacuum chamber when the tubular member is inflated, a compressed air line leading to the tubular member, means for periodically opening the compressed air line to inflate the tubular member, and means for preventing inflation of the tubular member if a container is not presented to the vacuum head.

20. An apparatus for vacuumizing and sealing containers, including a vacuum head, a raiser plate for elevating a container into cooperative relation with the vacuum head, a flexible tubular member for engaging the container and sealing off the vacuum head when the tubular member is inflated, a compressed air line leading to the tubular member, means for periodically opening the compressed air line to inflate the tubular member, a normally closed valve in the air line, and means operated by placing a container on the raiser plate for opening the valve.

21. An apparatus for vacuumizing and sealing containers, including a plurality of vacuum heads, a raiser plate in vertical alignment with each vacuum head for elevating containers into cooperative relation with the vacuum heads, a flexible tubular member carried by each vacuum head, said tubular member when inflated engaging a container and sealing off the vacuum head, means for periodically admitting pressure to the tubular members, an air valve individual to each vacuum head, and means individual to each raiser plate for opening the air valve when a container is positioned on a raiser plate.

22. An apparatus for vacuumizing and sealing containers, including a vacuum head, means for bringing a container into cooperative relation with the vacuum head, a vacuum line for vacuumizing the vacuum chamber, a flexible tubular member for engaging the container and sealing off the vacuum chamber when the tubular member is inflated, an air line for inflating the tubular member, a vacuum valve in the vacuum line, an air valve in the air line, and means for opening both of said valves when a container is positioned on the raiser plate.

23. An apparatus for vacuumizing and sealing containers, including a plurality of vacuum heads, a raiser plate in vertical alignment with each vacuum head for bringing containers into cooperative relation with the vacuum heads, a vacuum line communicating with each vacuum head, means for periodically opening the vacuum lines to a source of vacuum, a vacuum valve in each vacuum line, a flexible tubular member carried by each vacuum head, said tubular member when inflated engaging a container and sealing off the vacuum head, an air line leading to each tubular member, an air valve in each air line, and means individual to each raiser plate for opening its associated vacuum valve and air valve when a container is positioned on the raiser plate.

24. An apparatus for vacuumizing and sealing containers, including a plurality of vacuum heads, a plurality of raiser plates in vertical alignment with the vacuum heads, means for delivering containers to the raiser plates, the containers adapted to have closures loosely mounted thereon, said closures adapted to be rotated to sealing position, means for simultaneously elevating the raiser plates to move the containers into sealing relation with respect to the vacuum heads, means for vacuumizing the vacuum heads, a rotatable chuck in each vacuum head, means for simultaneously lowering the chucks to engage the closures, and means for simultaneously rotating the chucks to turn the closures to sealing position.

25. An apparatus for vacuumizing and sealing containers, including a plurality of vacuum heads, a plurality of raiser plates in vertical alignment with the vacuum heads, means for delivering containers to the raiser plates, the containers adapted to have closures loosely mounted thereon, said closures adapted to be rotated to sealing position, means for simultaneously elevating the raiser plates to move the containers into sealing relation with respect to the vacuum heads, means for vacuumizing the vacuum heads, a rotatable chuck in each vacuum head, means for simultaneously lowering the chucks to engage the closures, means for simultaneously rotating the chucks to turn the closures to sealing position, and a friction clutch between the rotating means and the chucks.

26. An apparatus for vacuumizing and sealing containers, including a plurality of vacuum heads, a plurality of raiser plates in vertical alignment with the vacuum heads, means for delivering containers to the raiser plates, the containers adapted to have closures loosely mounted thereon, said closures adapted to be rotated to sealing position, means for simultaneously elevating the raiser plates to move the containers into sealing relation with respect to the vacuum heads, means for vacuumizing the vacuum heads, a rotatable chuck in each vacuum head, means for simultaneously lowering the chucks to engage the closures, and means for simultaneously rotating the chucks to turn the closures to sealing position, said chucks being resiliently mounted.

27. An apparatus for vacuumizing and sealing containers, including a plurality of vacuum heads, a plurality of raiser plates in vertical alignment with the vacuum heads, means for delivering containers to the raiser plates, the containers adapted to have closures loosely mounted thereon, means for simultaneously elevating the raiser plates to move the containers into cooperative relation with the vacuum heads, means for vacuumizing the vacuum heads, a chuck in each vacuum head, means for simultaneously moving the chucks to move the closures to sealing position, and means for vertically adjusting all of the vacuum heads simultaneously.

28. An apparatus for vacuumizing and sealing containers, including a plurality of vacuum heads, a plurality of raiser plates, in vertical alignment with the vacuum heads, means for delivering containers to the raiser plates, the containers adapted to have closures loosely mounted thereon, means for simultaneously elevating the raiser plates to move the containers into cooperative relation with the vacuum heads, means for vacuumizing the vacuum heads, a chuck in each vacuum head, means for moving the chucks downward to push closures into sealing position, and means for rotating the chucks to turn closures to sealing position.

JOHN J. WILLIAMS.
JOSEPH BAUMAN.